United States Patent
Abbas et al.

(10) Patent No.: US 9,098,359 B2
(45) Date of Patent: Aug. 4, 2015

(54) DURABLE EXECUTION OF LONG RUNNING APPLICATIONS

(71) Applicant: Microsoft Corporation, Redmond, WA (US)

(72) Inventors: Samar Abbas, Woodinville, WA (US); Muralidhar Krishnaprasad, Redmond, WA (US); Affan Arshad Dar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/051,265

(22) Filed: Oct. 10, 2013

(65) Prior Publication Data

US 2015/0106825 A1 Apr. 16, 2015

(51) Int. Cl.
*G06F 9/54* (2006.01)
*G06F 9/48* (2006.01)
*G06F 11/14* (2006.01)

(52) U.S. Cl.
CPC .............. *G06F 9/542* (2013.01); *G06F 9/4862* (2013.01); *G06F 11/1471* (2013.01)

(58) Field of Classification Search
CPC .. G06F 9/54; G06F 9/4862; G06F 11/147122
See application file for complete search history.

(56) References Cited

U.S. PATENT DOCUMENTS

| 5,524,241 | A | 6/1996 | Ghoneimy et al. | |
|---|---|---|---|---|
| 6,275,863 | B1 | 8/2001 | Leff et al. | |
| 7,093,251 | B2 | 8/2006 | Tsun et al. | |
| 2007/0083645 | A1* | 4/2007 | Roeck et al. | 709/224 |
| 2008/0046696 | A1* | 2/2008 | Vertes | 712/214 |
| 2008/0086730 | A1* | 4/2008 | Vertes | 718/100 |
| 2009/0094582 | A1* | 4/2009 | Craft et al. | 717/127 |
| 2010/0251031 | A1* | 9/2010 | Nieh et al. | 714/45 |
| 2011/0264959 | A1* | 10/2011 | Subhraveti | 714/35 |
| 2012/0011491 | A1* | 1/2012 | Eldar | 717/130 |
| 2013/0254748 | A1* | 9/2013 | Subhraveti | 717/127 |
| 2013/0297566 | A1* | 11/2013 | Colrain et al. | 707/674 |

OTHER PUBLICATIONS

Dayal, et al., "Organizing Long-Running Activities with Triggers and Transactions", In Proceedings of the ACM SIGMOD International Conference on Management of Data, May 23, 1990, 11 pages.
"Service Bus Durable Task Framework", Published on: Jun. 2013, Available at: http://abhishekrlal.files.wordpress.com/2013/06/service-bus-durable-task-framework-developer-guide.docx.

(Continued)

*Primary Examiner* — Charles E Anya
(74) *Attorney, Agent, or Firm* — Ben Tabor; Stein Dolan; Micky Minhas (57) ABSTRACT

Executing a long running application while maintaining state of the application. A method includes identifying that a new event has taken place with respect to an execution of an orchestration. The method includes establishing the state of the orchestration by replaying the execution of the orchestration by replaying any previous state from a history of the execution of the orchestration. The method further includes executing a next instruction of the execution of the orchestration. The next instruction is an instruction coded in the orchestration to execute after items in the history have been replayed.

20 Claims, 5 Drawing Sheets

(56) References Cited

OTHER PUBLICATIONS

"Windows Communication Foundation: Application Deployment Scenarios", Published on: May 2008, Available at: http://msdn.microsoft.com/en-us/library/cc512374.aspx.

"What is AWS Flow Framework (Java)?", Retrieved on: Jul. 16, 2013, Available at: http://docs.aws.amazon.com/amazonswf/latest/awsflowguide/welcome.html.

"Durable Services", Published on: Mar. 24, 2012, Available at: http://my.safaribooksonline.com/book/programming/microsoft-wcf/9781449382476/instance-management/durable_services.

* cited by examiner

ET = EncodeTask

*Figure 2B*

C = Completion

*Figure 2C*

SPN = SendPushNotification

*Figure 2D*

C = Completion

DURABLE EXECUTION OF LONG RUNNING APPLICATIONS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

In distributed computing environments, long running applications may be implemented. Example long running applications are applications such as batch processing jobs or applications that are interacting with multiple services. Those services themselves have chunks of work items. Such work items may include, for example, provisioning a virtual machine in a cloud environment or setting up a database, etc. In particular, an orchestrator may control the overall flow of a long running application and may assign different worker tasks to perform substantive activities associated with the orchestrator instance. In present implementations, long running applications are quite non-trivial to implement. Developers typically write a lot of plumbing code for the simplest of these long running apps. Thus, rather than just being able to focus on coding application functionality, the developer also spends considerable time determining how entities for running the long running application interact with each other.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed computing environment configured to execute long running applications. The method includes acts for executing a long running application while maintaining state of the application. The method identifying that a new event has taken place with respect to a running execution of an orchestration. As a result of identifying that a new event has taken place with respect to the running execution of the orchestration, the method includes establishing the state of running execution of the orchestration by replaying events from history of the running execution of the orchestration. The previous state in the history of the running execution of the orchestration was added to the history of the running execution of the orchestration as a result of executing previous instructions of the running execution of the orchestration. After replaying the running execution of the orchestration, the method further includes executing a next instruction of the running execution of the orchestration. The next instruction is an instruction coded in the orchestration to execute after items in the history have been replayed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may implement various features. Two particularly interesting features are as follows: One feature enables the capability for developers to express their long running control flow (sometimes referred to herein as an orchestration) entirely in a framework code using familiar asynchronous constructs. Thus, the developer would not need to code the specific plumbing between distributed elements, but rather can focus on coding for functionality. For example, in some embodiments a developer may be able to code using .NET code available from Microsoft Corporation of Redmond Washington using the asynchronous constructs async and await.

A second feature of some embodiments facilitates application state maintenance by maintaining and using a history of events to replay the program execution for rebuilding state each time a new instruction is executed from an executing instance of an orchestration for a long running program. This is used to continue program execution from where execution last left off.

Figure 1:
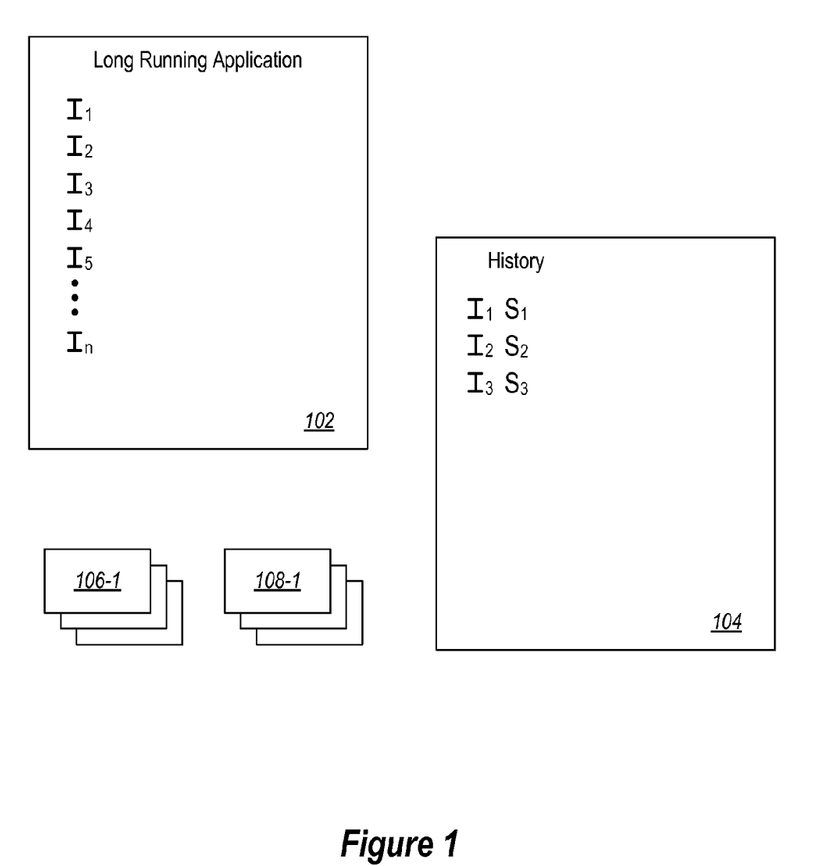
FIG. 1 illustrates a simple example of an orchestration and replaying state for the orchestration.

A simple example of replaying functionality is illustrated in FIG. 1. FIG. 1 illustrates a long running application 102 coded using developer code. In particular, asynchronous instructions $I_1$ through $I_n$ are illustrated. FIG. 1 further illustrates a history 104. The history 104 illustrates state $S_1$ through $S_3$ created as the result of executing instructions $I_1$ through $I_3$ respectively.

Replaying a running instance of the long running application 102 is performed by beginning execution of the long running application from the beginning at $I_1$ within the context of the history 104. In particular, an orchestration agent 106-1 begins execution by attempting to execute instruction $I_1$. In performing this, a check is first made to the history 104 to determine if state already exists resulting from a previous execution of $I_1$. The check of the history reveals that state $S_1$ already exists, and thus, that state is applied to the execution of the long running application 102 without performing substantive processing tasks by worker agents that would ordinarily be done to create or obtain the state $S_1$. This can be repeated for instruction $I_2$ (and state $S_2$) and instruction $I_3$ (and state $S_3$) as the state associated with those instructions is stored in the history 104. However, once processing of the long running application 102 reaches instruction $I_4$, the orchestration agent 106-1 can determine that state does not exist as a result of a previous execution of instruction $I_4$. Therefore, the orchestration agent 106-1 will cause the instruction $I_4$ to be executed. This may result in substantive work being performed by some worker agent (for example, by making a call to a long running application activity), such as agent 108-1, which will cause the creation of some state S4 (not shown). The history will then be updated to include an entry for instruction $I_4$ and state $S_4$.

The instructions $I_1$-$I_n$ are asynchronous instructions. This means that once one of the instructions is called, the agent that called the instruction may be freed up to do other tasks. In doing so, it may "forget" all of the previously created or obtained state. Thus, in the preceding example, once the orchestration agent 106-1 calls the instruction $I_1$, which causes the worker agent 108-1 to begin a substantive processing task, the orchestration agent 106-1 may forget state $S_1$, $S_2$ and $S_3$ as it performs other tasks. The worker agent 108-1, after completing the substantive processing may update the history to indicate instruction $I_4$ was executed, along with some state $S_4$ being stored in the history. As a result of the worker agent 108-1 performing the substantive work, an orchestration agent 106-1 (or some other agent from the set 106 of agents) may know to begin processing the long running application 102 again. This will occur by replaying the long running application from the beginning (i.e. at instruction $I_1$) in the context of the history 104. State will be able to be obtained from the history 104 without causing substantive work operations to be performed by worker agents until instruction $I_5$ is reached, at which time additional substantive work will need to be performed by one or more worker agents.

Note that FIG. 1 illustrates a simplified example of one embodiment and that various queues and data handling protocols may be used as will be illustrated in more detail below.

Embodiments will now be discussed generally. Long running control flow can easily be expressed using regular asynchronous constructs, such as, for example, async/await in .Net. By implementing a framework task scheduler which is powered by a durable queue, embodiments can provide an experience where complicated control flow logic for long running applications can entirely be expressed as framework code. Illustratively, user code schedules a task to a durable queue (or set of queues). The task is then dispatched to an appropriate worker. Once the worker is done processing the task, the result of processing is communicated back by also putting the result back into the queue (or set of queues).

Embodiments also maintain a history (e.g. history 104) of events for every execution of a particular long running application in a durable store. This is very useful in rebuilding the state of a long running program by replaying these events over user code (e.g. the code including the instructions $I_1$ through $I_n$) when the next event happens. Thus instead of serializing the entire execution state when the program goes idle, embodiments can simply rebuild the state by replaying user code from the beginning using these events from the history. Using this technique, embodiments can be implemented that do not have to store any additional state and yet embodiments can continue program executions where it last left off using the replay mechanism.

Some embodiments may include the following features:

Task dispatch

Queue-to-Queue transfer

Sessions

Transactions

One particular embodiment implements these features using the Windows Azure® ServiceBus, available from Microsoft Corporation of Redmond Wash., as a backend. Some embodiments provide a thin client-side framework which internally uses above mentioned features to provide an experience enabling developers to entirely express their long running applications in native framework code. Using such functionality, embodiments can be implemented which do not need to explicitly model their application states.

Using this framework, users can implement long running control flow as regular native framework code. Framework documentation may so indicate such functionality to users so as to instruct the users to use the native framework code, rather than creating their own plumbing code. Some embodiments use a context object for scheduling any user specific tasks. This control flow is executed synchronously using the framework when an event happens for this application.

In some embodiments, when user code cannot make any progress and there are no events in the history for that execution, the framework takes all the scheduled calls made at this point and puts messages for task implementation workers onto appropriate queues. The framework also records, in session state in the history, that all the scheduled calls are processed. A task implementation worker picks up scheduled tasks, calls the appropriate implementation and communicates the result back to application by sending a completion message to its queue. The framework once again calls user code in response to the completion event for the task and replays the execution history from the beginning providing results (e.g. state) for tasks already completed. The framework iteratively performs these actions until there are no more pending tasks for that execution, at which point it marks the long running execution complete.

For instance consider the following simple two step application written in .Net for video encoding and sending a push notification:

```
public override async Task<bool> RunTask(OrchestrationContext context,
string blobId)
{
    string encodedId = await context.ScheduleTask<string>("EncodeTask",
blobId);
    bool result = await context.ScheduleTask<bool>("SendPushNotification",
encodedId);
    return result;
}
```

Figure 2A:
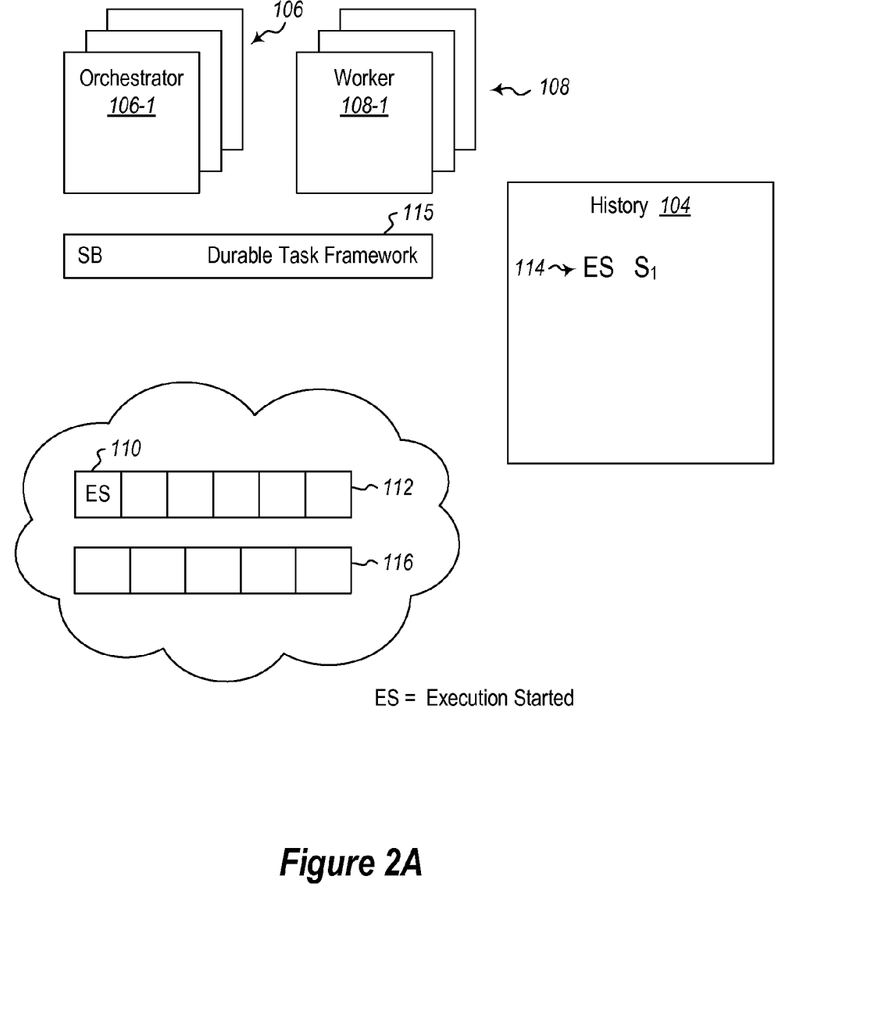
FIG. 2A illustrates various components used to implement a long-running application.

Reference is also made to FIG. 2A which illustrates various components that can be used for the implementation. To start an execution of this application a user sends an "Execution Started Event" message 110 to an application queue 112:

```
{
    type: "ExecutionStarted",
    name: "MediaApp",
    version: "1.0",
    input: "blob1"
}
```

Figure 2B:
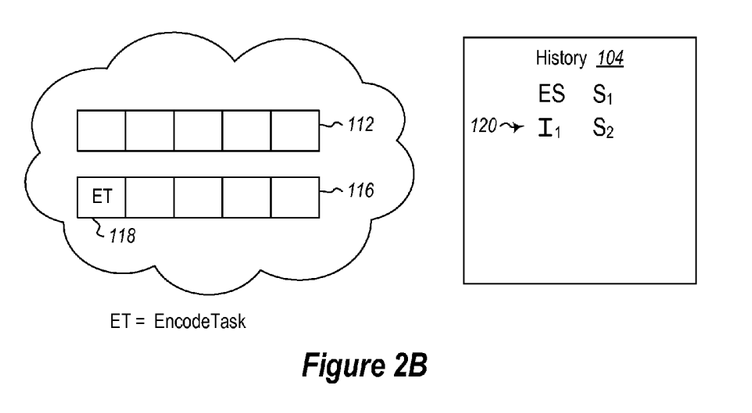
FIG. 2B illustrates actions applied to queues and a state history.

An application worker agent 108-1 (although any application worker could be selected from among the set 108 or worker agents) picks up the message 110 and creates a new session for this execution and creates an entry 114 in the history 104 with "ExecutionStartedEvent". Then user code is invoked in response to "ExecutionStarted" event 114 from the history 104. Initially the user code cannot proceed beyond schedule task for "EncodeTask" as the user has an "await" on the result for "EncodeTask" before it can make further progress. At this point control comes back to framework 116 which schedules an "EncodeTask" event message 118 in the task implementation queue 116, as illustrated in FIG. 2B, and updates the history 104 for the application in a single ServiceBus transaction as shown below:

```
{
    type: "ExecutionStarted",
    name: "MediaApp",
    version: "1.0",
    input: "blob1"
},
{
    id: 1,
    type: "TaskScheduled",
    name: "EncodeTask",
    version: "1.0",
    input: "blob1",
}
```

As illustrated, embodiments may be implemented where three things happen transactionally. In general, a message will be consumed (including removing the message from the queue from which it is consumed), the history will be updated, and a message will be placed onto a queue. All of this is done transactionally, such that if any of the three operations fail, all three will be rolled back. In some embodiments, all three must be successfully completed, for the transaction to complete and the actions to be completed. In the specific example illustrated, the ExecutionStarted message 110 is consumed from the application queue 112, the history 104 is updated with the entry 120, and the EncodeTask event message 118 is added to the task implementation queue 116.

At this point, some explanation is provided regarding the application queue 112 and the task implementation queue 116. Items placed into the application queue 112 provide an indication to an orchestrator (such as orchestration agent 106-1) to direct processing. Such events may be events indicating the processing should begin, or that a task has been completed by a worker and that processing can continue.

Entries into the task implementation queue, which are automatically consumed by workers (such as worker agent 108-1), are an indication that a worker should perform some substantive work. Example of the substantive work performed by worker agents in the present example include: encoding video and sending a push notification.

Figure 2C:
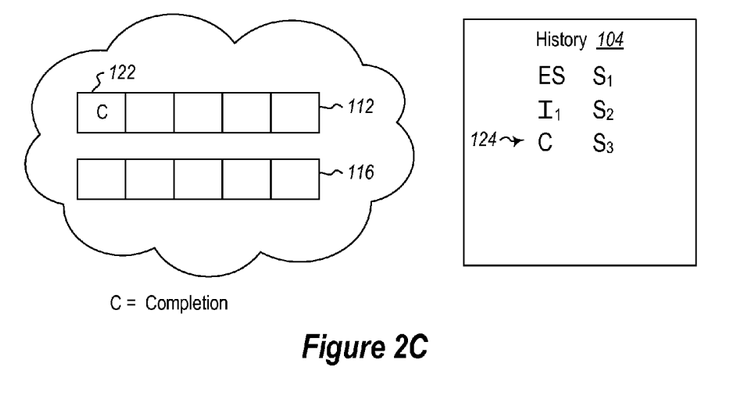
FIG. 2C illustrates actions applied to queues and a state history.

Continuing now with the running example, now a task implementation worker (e.g. worker agent 108-1) consumes the message 118 for "EncodeTask" (including removing it from the queue 116, as illustrated in FIG. 2C), invokes an implementation to perform substantive processing associated with the message 118 (in this case, encoding video) and once the substantive processing of the implementation is complete, takes the result and sends a completion message 122 back to application queue 112. An application worker (e.g. orchestration agent 106-1) now consumes the completion message 122 and reconciles the history as by adding a task completed entry 124 as shown below:

```
{
    type: "ExecutionStarted",
    name: "MediaApp",
    version: "1.0",
    input: "blob1"
},
{
    id: 1,
    type: "TaskScheduled",
    name: "EncodeTask",
    version: "1.0",
    input: "blob1",
},
{
    type: "TaskCompleted",
    schedule_Id: 1,
    result: "encodedBlob",
}
```

Figure 2D:
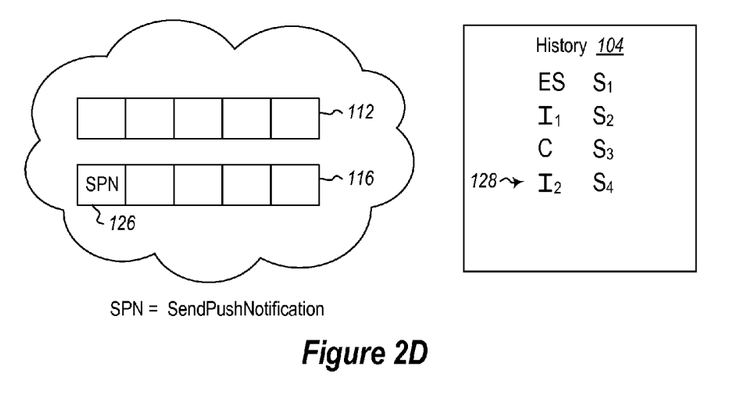
FIG. 2D illustrates actions applied to queues and a state history.

The application worker (in the present example, orchestration agent 106-1, or another appropriate orchestration agent) calls user code again by replaying events from the history 104. As there are more events in the history 104 this iteration, user code makes more progress and, as illustrated in FIG. 2D, the embodiment schedules a "SendPushNotification" task message 126 into the task implementation queue 116. The history 104 in the session is updated with the entry 128 to appear as follows, as a result of this operation:

```
{
    type: "ExecutionStarted",
    name: "MediaApp",
    version: "1.0",
    input: "blob1"
},
{
    id: 1,
    type: "TaskScheduled",
    name: "EncodeTask",
```

```
        version: "1.0",
        input: "blob1",
    },
    {
        type: "TaskCompleted",
        schedule_Id: 1,
        result: "encodedBlob",
    },
    {
        id: 2,
        type: "TaskScheduled",
        name: "SendPushNotification",
        version: "1.0",
        input: "encodedBlob",
    }
```

Figure 2E:
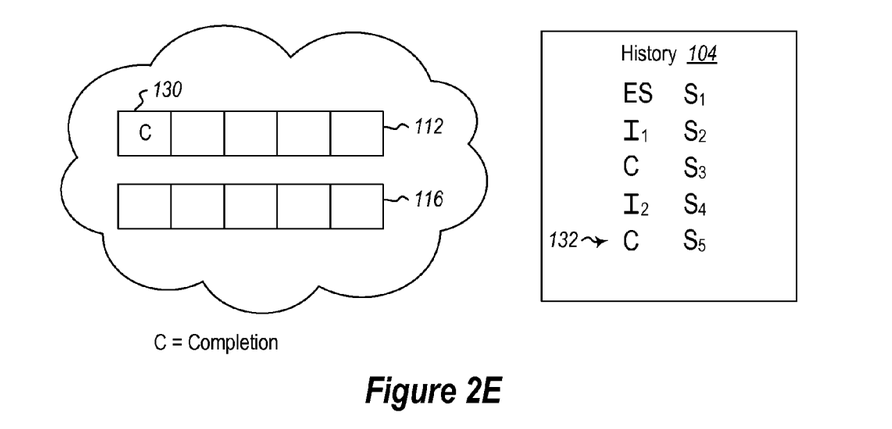
FIG. 2E illustrates actions applied to queues and a state history.

A task implementation worker (e.g. worker agent 108-1 or another appropriate worker agent) then picks up the message 126 for "SendPushNotification", invokes the implementation for the message and once it is done stores the result and sends a completion message 130 back to the application queue 112, as illustrated in FIG. 2E. An application worker (e.g. orchestration agent 106-1, or another orchestrator) now consumes the completion message 130 and reconciles the history 104 as shown below by adding the entry 132:

```
{
    type: "ExecutionStarted",
    name: "MediaApp",
    version: "1.0",
    input: "blob1"
},
{
    id: 1,
    type: "TaskScheduled",
    name: "EncodeTask",
    version: "1.0",
    input: "blob1",
},
{
    type: "TaskCompleted",
    schedule_Id: 1,
    result: "encodedBlob",
},
{
    id: 2,
    type: "TaskScheduled",
    name: "SendPushNotification",
    version: "1.0",
    input: "encodedBlob",
},
{
    type: "TaskCompleted",
    schedule_Id: 2,
    result: "true",
}
```

Figure 2F:
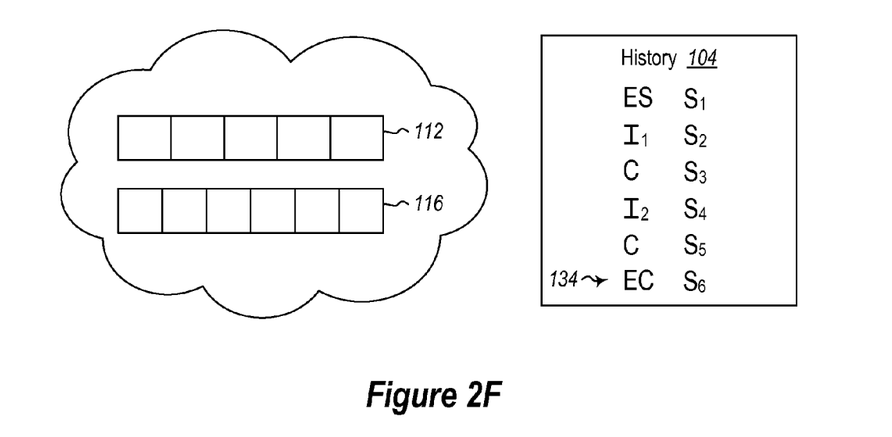
FIG. 2F illustrates actions applied to queues and a state history.

Once again, the application worker (e.g. orchestration agent 106-1) calls user code by replaying events from the history 104. This time, because all the tasks are completed it marks the execution as completed by updating the history 104 with an "ExecutionCompleted" entry 134 as illustrated in FIG. 2F. The history in the session is updated as follows:

```
{
    type: "ExecutionStarted",
    name: "MediaApp",
    version: "1.0",
    input: "blob1"
},
{
    id: 1,
    type: "TaskScheduled",
    name: "EncodeTask",
    version: "1.0",
    input: "blob1",
},
{
    type: "TaskCompleted",
    schedule_Id: 1,
    result: "encodedBlob",
},
{
    id: 2,
    type: "TaskScheduled",
    name: "SendPushNotification",
    version: "1.0",
    input: "encodedBlob",
},
{
    type: "TaskCompleted",
    schedule_Id: 2,
    result: "true",
},
{
    type: "ExecutionCompleted",
    result: "true",
}
```

In implementing various embodiments, certain considerations should be taken into account. For example, code may need to be deterministic as it will be replayed multiple times from the history. Thus, any replayed code may be such that it yields the same result every time. For example, direct calls to get the current date/time, random numbers, Guids or remote service invocations etc. may need to be avoided. If non-deterministic calls are needed, some embodiments include helper APIs. For example, one helper API may provide a deterministic way to get the current date/time.

Additionally, users can make the non-deterministic operations deterministic by wrapping them within calls implemented by embodiments of the invention. In particular, as results of calls are replayed by the framework, the non-deterministic value will be generated once on a first execution and then on subsequent executions the same value will be replayed from the history 104.

Embodiments are implemented where the code is non-blocking. For example, no thread sleep or thread wait methods are used. However, the framework may provide helper methods to setup timers which can be used instead.

User code is executed in a single thread. This means that if the code was awaiting multiple tasks and one of them completed followed immediately by another one, the framework is guaranteed to run the continuations for both of these tasks serially.

Any exception that is thrown in the task code is marshalled back and thrown as an exception in the user code. Users can write the appropriate error handling and compensation code that suits their needs around this.

Users can wait on asynchronous timer events within the orchestration code. Consider the following code snippet:

```
public class EncodeVideoOrchestration : TaskOrchestration<string, string>
{
    public override async Task<string> RunTask(OrchestrationContext context, string input)
    {
        string encodedUrl = await context.ScheduleTask<string>(typeof (EncodeActivity), input);
        await
```

```
context.CreateTimer(context.CurrentUtcDateTime.Add(TimeSpan.From
Days(1)), "timer1");
    await context.ScheduleTask<object>(typeof (EmailActivity), input);
    return encodedUrl;
  }
}
```

The line:
await context.CreateTimer(context.CurrentUtcDateTime.Add(TimeSpan.FromDays(1)), "timer1"); will cause the orchestration to sleep for one day between the encode video and the email activity.

Timers can be used to do periodic work as well as timeouts. Consider the following code:

```
sdfsdfsfsdfsdffsdfsddsfsfd public class BillingOrchestration : TaskOrchestration<string, string>
{
  public override async Task<string> RunTask(OrchestrationContext
context, string input)
  {
    for (int i = 0; i < 10; i++)
    {
      await
context.CreateTimer(context.CurrentUtcDateTime.Add(TimeSpan.
FromDays(1)), "timer1");
        await context.ScheduleTask<object>(typeof (BillingActivity));
    }
    return null;
  }
}
```

In the snippet above, the billing orchestration will be signaled every day and will invoke some billing activity on waking up.

Also, consider the following example:

```
public class GetQuoteOrchestration : TaskOrchestration<string, string>
{
  public override async Task<string> RunTask(OrchestrationContext
context, string input)
  {
    Task timer = context.CreateTimer(
        context.CurrentUtcDateTime.Add(TimeSpan.FromSeconds(5)),
"timer1");
    Task getQuote = context.ScheduleTask<object>(typeof(GetQuote));
    Task winner = Task.WhenAny(timer, getQuote);
    if (timer.IsCompleted)
    {
      // request timed out, do some compensating action
    }
    else
    {
      // use getQuote task result
    }
    return null;
  }
}
```

In this snippet, embodiments schedule the GetQuote activity and also create a timer to fire in 5 seconds. If the timer fires before the activity returns then embodiments run some compensation. Otherwise embodiments use the returned quote.

Embodiments may support waiting on external events. Often orchestrations need to wait for external events like a human being entering some input or some other external trigger. The framework provides a mechanism for the orchestration to asynchronously wait for an external event. For example, consider the following code:

```
public class GetQuoteOrchestration : TaskOrchestration<string, string>
{
  TaskCompletionSource<object> getPermission = new
TaskCompletionSource<object>( );
  public override async Task<string> RunTask(OrchestrationContext
context, string input)
  {
    await getPermission.Task;
    await context.ScheduleTask<object>(typeof (GetQuote), null);
    return null;
  }
  public override void OnEvent(OrchestrationContext context, string name,
string input)
  {
    getPermission.SetResult(null);
  }
}
```

To trigger the event from the outside, the user can call the TaskHubClient.RaiseEvent method.

```
TaskHubClient client = new TaskHubClient("test", serviceBusConnString);
OrchestrationInstance instance = client.CreateOrchestrationInstance(typeof
(EncodeVideoOrchestration),
            "http://<azurebloblocation>/MyVideo.mpg");
client.RaiseEvent(instance, "dummyEvent", "dummyData");
```

Embodiments may support infinite loops (or really long lived orchestrations). As mentioned above, the framework replays the execution history to recreate program state for the user's orchestration instance. A history that is bounded by size would not support an orchestration with infinite loops. However, by using a generation feature, users can 'checkpoint' one orchestration instance and create a new one. For example, consider the following code:

```
public class CronOrchestration : TaskOrchestration<string, int>
{
  public override async Task<string> RunTask(OrchestrationContext
context, int intervalHours)
  {
    // bounded loop
    for (int i = 0; i < 10; i++)
    {
      await context.CreateTimer<object>(
        context.CurrentUtcDateTime.Add(TimeSpan.FromHours
(intervalHours)), null);
      // TODO : do something interesting
    }
    // create a new instance of self with the same input (or different if
needed)
    context.ContinueAsNew(intervalHours);
    return null;
  }
}
```

In this snippet, the user is telling the framework to create a brand new instance of itself (i.e. a new generation or execution) and forwards the input it received as the input to the new instance. This orchestration can run indefinitely without running into the history size limitations.

Embodiments may support reusing existing orchestrations. Orchestrations can also start and wait on other orchestrations using a sub orchestration feature. This is useful for cases where embodiments have a library of orchestrations and a user want to build a larger orchestration around these. Consider the following code:

```
public class PeriodicBillingJob : TaskOrchestration<string, int>
{
  // hardcoded list of apps to run billing orchestrations on
  static readonly string[ ] ApplicationList = new string[ ] { "app1",
```

-continued

```
"app2" };
    public override async Task<string> RunTask(OrchestrationContext
context, int intervalHours)
        {
        // bounded loop
        for (int i = 0; i < 10; i++)
        {
            await context.CreateTimer<object>(
                context.CurrentUtcDateTime.Add(TimeSpan.FromHours
(intervalHours)), null);
            List<Task> billingTasks = new List<Task>( );
            foreach (string appName in PeriodicBillingJob.ApplicationList)
            {
                billingTasks.Add(
                    context.CreateSubOrchestrationInstance<bool>(typeof
(BillingOrchestration), appName));
            }
            await Task.WhenAll(billingTasks);
        }
        // create a new instance of self with the same input (or different if
needed)
        context.ContinueAsNew(intervalHours);
        return null;
        }
}
// a reusable orchestration which can either be triggered directly by the
admin or via
// some master recurring periodic billing orchestration
public class BillingOrchestration : TaskOrchestration<bool, string>
{
    public override async Task<bool>RunTask(OrchestrationContext context,
string applicationName)
    {
        // TODO : process billing information for 'applicationName'
        return true;
    }
}
```

The functionality described above allow developers to focus more on control flow for their long running application, without worrying about plumbing code to provide durability for their long running application.

As noted, in the implementation described above, various tasks may be performed transactionally. Additional details are now illustrated regarding various aspects related to the transactional processing. In particular, in the following description, functionality is illustrated for: (1) using queue session state for storing state of a Remote Procedure Call (RPC) flow; (2) updating the queue session state along with enqueuing an RPC message in a queue-to-queue transfer agent within a local transaction; and (3) relying on the queue-to-queue transfer agent to reliably send the RPC message to the work queue of a remote worker.

Imperative code that represents a distributed system interaction has RPC calls and some control flow built around these RPC calls. For instance consider the following pseudo-code snippet:

```
If(RemoteMethodA( ) == true)
{
    RemoteMethodB( );
}
```

In this snippet, the program intends to execute MethodA remotely and if the remotely executed MethodA returns true, the program wants to continue executing MethodB remotely.

In a naïve implementation of this system, the system executing the imperative distributed program (e.g. an orchestrator, such as orchestration agent 106-1 executing an instance of an orchestration, such as the long running application 102) can synchronously call MethodA( ) on the remote node (e.g. a worker such as worker agent 108-1). The worker will respond either true or false and then the orchestrator can either invoke MethodB( ) synchronously or skip it depending on the response.

There are no guarantees in the naïve system; the worker can be offline or the network between the orchestrator and the worker can be partitioned. This is especially problematic if it happens in the middle of the control flow. E.g. if MethodA( ) was executed and returned some result and MethodB( ) was about to be executed when the worker went offline. In this case the overall state is not only inconsistent but will always stay inconsistent.

Various other systems may be implemented to attempt to address the potential inconsistencies, but they each have potential for inconsistency as well. For example, in a slightly more resilient version of the system, the orchestrator and the worker are receiving messages from queues rather than direct communication. In this case temporal resiliency can be achieved. I.e. if worker is offline, the orchestrator can still enqueue messages in its queue so it has work to do whenever it comes back online. However, even in this case there are consistency issues because the orchestrator could crash and forget that it had already sent the message for MethodA( ) and potentially that it had received the response for MethodA( ) as well. In cases like these, the only option left for the orchestrator may be to invoke MethodA( ) again.

Some embodiments herein use the following features of a queuing system to provide eventual consistency:

i) Queue session state: a group of messages in a queue can be grouped into a logical 'session' (such as the orchestration instances illustrated above) and some arbitrary session state (e.g. the history 104) can be associated with this session. Furthermore, updates to this session state and receives from this queue can be done within a local transaction making it consistent.

ii) Queue sessions can be locked by a receiver on the queue via an accept-message-session primitive.

iii) Queue-to-queue transfer: a message can be enqueued in a source queue and marked for reliable transfer to a destination queue (e.g. from the application queue 112 to the implementation queue 116). If the transfering agent exhausts all possible transfer attempts and mechanisms, it will place the un-transferrable message in a 'deadletter queue'. Furthermore, if the source queue has a session with associated state and messages, the state (e.g. the history 104) can be updated and messages in the session can be deleted along with enqueuing of transfer messages within the same local transaction.

Using these primitives, an embodiment may be implemented as follows:

i) Every new execution of the imperative program (e.g. an instance of an orchestration) representing the RPC interactions is associated with a unique session in the application queue 112. Furthermore, to start a new execution, a new message session is created in the application queue 112 and a 'start-execution' message (e.g. message 110) is enqueued in the application queue 112 within this session.

ii) The orchestrator node (e.g. using an orchestration agent 106-1) continuously polls the application queue 112 for message sessions that have pending work. Pending work is indicated by the presence of one or more messages within a message session.

iii) For a new execution, the orchestration gets a new message session from the queue via the accept-message-session primitive. The accept-message-session primitive also locks the message session so that another instance of the orchestrator node (e.g. another orchestrator agent from the set 106 of agents) would not get the same session.

iv) The orchestrator peek-locks all the messages belonging to this message session from the application queue 112 v) The orchestrator executes the new orchestration up until the point where a remote method is invoked.

vi) When a remote method is invoked, the orchestrator does the following within a single local transaction:

Enqueue a transfer message 'execute-work-item' into the application queue 112 and set the destination as the implementation queue 116.

Update the message session state to indicate that the RPC invocation has been made.

Delete the start-execution message from the application queue 112.

vii) If the transaction in (vi) rolls back then the system goes back into the initial state where the message session is still new, the start-execution message is put back into the application queue 112 and no new transfer messages have been enqueued in the application queue 112. The control flow loops back to (iii) after this. The orchestration code is idempotent to maintain consistency guarantees at this point.

viii) If the transaction in (vi) committed successfully then the application queue 112 now contains an empty message session with an updated state (e.g., history 104) indicating that a remote method was invoked. Furthermore, the 'execute-work-item' transfer message will be marked for transfer to the implementation queue 116.

ix) The reliable transfer agent will transfer the 'execute-work-item' message to the implementation queue 116. If the transfer fails then, in some embodiments, the transfer agent will retry the transfer. Embodiments may be implemented where the transfer agent will continue retrying potentially with exponential back-off until it has exceeded the number of preconfigured retries. If the transfer cannot be made (in some embodiments after the predetermined number of retries have been tried), the transfer message will be moved to a deadletter queue. In this case the orchestrator will receive the dead lettered message, and will know that the method invocation had definitively failed. The orchestrator will then notify and use the language appropriate mechanism to propagate this error case to the orchestration. For example, in some embodiments, the orchestrator may use exception throwing functionality to propagate the error case.

x) Assuming that the transfer was successful, the 'execute-work-item' task would now have moved to the implementation queue 116.

xi) A worker polls the implementation queue 116 for new messages and peek-locks the 'execute-work-item' message. It inspects the contents of the message and executes the specified work item.

xii) The execution of the work item generates one or more return values. The worker performs the following actions in a single local transaction:

Sends an 'execute-work-item-response' transfer message via the implementation queue 116 back to the application queue 112. Furthermore, this message is annotated such that it would become part of the original message session in the application queue 112 that originated the work item in the first place.

Delete the 'execute-work-item' message from the application queue 112.

xiii) If the transaction in (xii) rolls back then the execute-work-item message is put back in the implementation queue 116 and no transfer message is enqueued in the implementation queue 116. The worker will process the execute-work-item message again. The work item execution is idempotent at this point to maintain consistency.

xiv) If the transaction in (xii) is committed successfully then the execute-work-item-response message will be transferred back via the transfer agent to the application queue 112.

xv) The orchestrator will find the execute-work-item-response message in the queue and process the suspended orchestration by injecting the response of the work item into the orchestration. It will then continue execution of the orchestration until either it comes across another remote method invocation or the orchestration finishes.

xvi) If there is another remote method invocation then the orchestrator and worker go through the same steps starting from (vi) with the addition that all new messages in the message session are deleted rather than just the start-execution message.

xvii) If the orchestration finishes then it is deemed completed.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
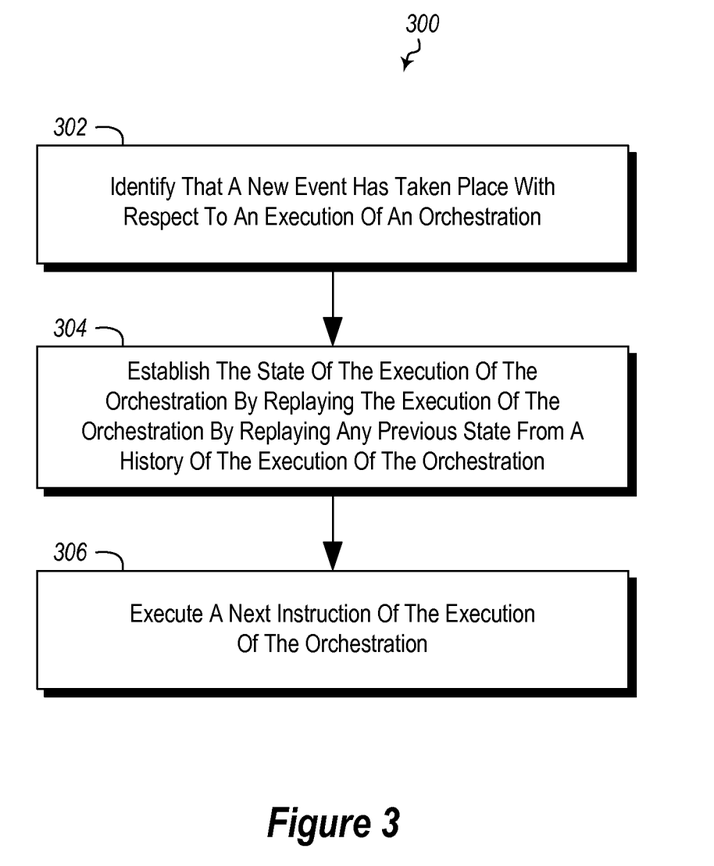
FIG. 3 illustrates a method of a method of executing a long running application.

Referring now to FIG. 3, a method 300 is illustrated. The method may be practiced in a distributed computing environment configured to execute long running applications. The method includes acts for executing a long running application while maintaining state of the application. The method includes identifying that a new event has taken place with respect to an execution of an orchestration (act 302). For example, as illustrated in FIG. 2B, a completion event message identifies that a completion event has occurred.

As a result of identifying that a new event has taken place with respect to the execution of the orchestration, the method further includes establishing the state of the execution of the orchestration by replaying the execution of the orchestration by replaying any previous state from a history of the execution of the orchestration (act 304). The previous state in the history of the execution of the orchestration was added to the history of the execution of the orchestration as a result of executing previous instructions of the execution of the orchestration. For example, as illustrated in FIG. 2C, the items in the history 104 can be replayed to re-establish the state of the long running application.

After replaying the execution of the orchestration, the method further includes executing a next instruction of the execution of the orchestration (act 306). The next instruction is an instruction coded in the orchestration to execute after items in the history have been replayed. For example, as illustrated in the example above, the instruction $I_2$ could be executed once the state in the History 104 has been established for the long running application.

The method 300 may further include repeating the acts of claim 1 until all instructions in the running execution of the orchestration have been executed.

The method 300 may be practiced where executing a next instruction comprises making a call to a long running application activity. For example, as illustrated in the running examples above, encoding (EncodeTask) and messaging (SendPushNotification) activities are illustrated.

The method 300 may be practiced where identifying that a new event has taken place comprises identifying that an asynchronous event has occurred due to the completion of work resulting from an asynchronous instruction in a long running application framework. For example, as illustrated in the running examples above, a TaskCompleted event can be issued for the EncodeTask and SendPushNotification instructions. Such a method may further include identifying asynchronous instructions by a specific language call indicating that the instruction is asynchronous. For example, in the running examples illustrated above, async and await are used in the .Net programming platform.

The method 300 may be practiced where identifying that a new event has taken place may include identifying that a timer has fired. Alternatively or additionally, identifying that a new event has taken place may include identifying that a sub-orchestration is to be created to extend the life of a long-running application. Alternatively or additionally, identifying that a new event has taken place may include identifying that an external event external to the long running application framework has occurred, etc.

The method 300 may further include accessing an orchestration. The orchestration includes a plurality of instructions including one or more asynchronous instructions. This embodiment may further include executing an asynchronous instruction from the orchestration, and storing state created by execution of the asynchronous instruction in a running history of an execution of the orchestration. The running history stores state for asynchronous instructions of the running execution of the orchestration.

The method 300 may be practiced where an indication of the event is placed on an application queue. Executing a next instruction results in the indication being removed from the application queue, an indication being added to an implementation queue, and the history being updated to add state created as a result of executing the new instruction to the history. Removing from application queue, adding to the implementation queue, and updating history is performed transactionally such that all three successfully complete and commit or abort and are rolled back.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

In its most basic configuration, a computing system typically includes at least one processing unit and memory. The memory may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description herein, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory of the computing system. The computing system may also contain communication channels that allow the computing system to communicate with other message processors over, for example, a network.

Embodiments described herein may comprise or utilize a special-purpose or general-purpose computer system that includes computer hardware, such as, for example, one or more processors and system memory, as discussed in greater detail below. The system memory may be included within the overall memory. The system memory may also be referred to as "main memory", and includes memory locations that are addressable by the at least one processing unit over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method facilitating replay of a long running application having a plurality of instructions, by maintaining and using a history of executed events to replay program execution for rebuilding state each time a new instruction is executed, so that a developer of the long running application is able to implement control flow as regular native framework code rather than creating specific plumbing code between distributed elements, the computer-implemented method being performed by one or more processors when executing computer-executable instructions which, when executed, cause the one or more processors to perform the computer-implemented method, which comprises the following acts:

generating a history execution events for a plurality of instructions of a long running application, by performing the following:
    initiating an application queue and a task implementation queue, where a first type of message for an execution event placed in the application queue is consumed by an orchestration agent to direct processing of the execution event, and a second type of message for an execution event placed in the task implementation queue is consumed by a worker agent to perform substantive processing of the execution event corresponding to the second type of message;
    initiating execution of the plurality of instructions of the long running application;
    identifying a first type of message and placing the first type of message in the application queue;
    removing the first type of message from the application queue and consuming the first type of message with the orchestration agent, and then updating a transaction history with a first state of the long running application based on the consumed first type of message;
    identifying a second type of message and placing the second type of message in the implementation queue; and
    removing the second type of message from the implementation queue and consuming the second type of message with the worker agent, and then updating the transaction history with a second state of the long running application based on the consumed second type of message;
identifying that an execution event for at least one retrieved instruction is a new event that has taken place with respect to execution by an orchestration agent;
as a result of identifying that a new event has taken place, establishing the state of the execution for the long running application by replaying any previous state from the transaction history; and
after replaying any previous state from the transaction history, executing a next instruction of the long running application, the next instruction executing only after the previous state from the transaction history has been replayed.

2. The method of claim 1, further comprising repeating the acts of claim 1 until all instructions have been executed for a particular orchestration of the long running program.

3. The method of claim 1, wherein executing a next instruction of the long running application comprises making a call to a long running application activity.

4. The method of claim 1, wherein identifying that a new event has taken place comprises identifying that an asynchronous event has occurred due to the completion of work resulting from an asynchronous instruction in a long running application framework.

5. The method of claim 4, further comprising identifying asynchronous instructions by a specific language call indicating that the instruction is asynchronous.

6. The method of claim 1, wherein identifying that a new event has taken place comprises identifying that a timer has fired.

7. The method of claim 1, wherein identifying that a new event has taken place comprises identifying that a sub-orchestration is to be created to extend the life of the long-running application.

8. The method of claim 1, wherein identifying that a new event has taken place comprises identifying that an event external to the long running application framework has occurred.

9. The method of claim 1, wherein generating the history of execution events for the plurality of instructions of a long running application includes generating the history for one or more asynchronous instructions of the long running application.

10. The method of claim 9, wherein identifying that an execution event for at least one retrieved instruction is a new event that has taken place results in performing the further acts of:
removing a first type of message for a previous execution event from the application queue;
adding a second type of message for the new event in the implementation queue;
updating the transaction history to add a new state created as a result of executing the retrieved instruction for the new event; and
wherein removing the first type of message for the previous execution event from application queue, adding the second type of message for the new event to the implementation queue, and updating the transaction history are performed transactionally such that all three either successfully complete and commit, or all three abort and are rolled back.

11. A computer program product comprising a physical computer readable storage medium comprising computer executable instructions that when executed by one or more processors cause a computer-implemented method to be performed, the computer-implemented method facilitating replay of a long running application having a plurality of instructions, by maintaining and using a history of executed events to replay program execution for rebuilding state each time a new instruction is executed, so that a developer of the long running application is able to implement control flow as a regular native framework code rather than creating specific plumbing code between distributed elements, and the computer-implemented method comprising:
generating a history of execution events for a plurality of instructions of a long running application, by performing the following:
initiating an application queue and a task implementation queue, where a first type of message for an execution event placed in the application queue is consumed by an orchestration agent to direct processing of the execution event, and a second type of message for an execution event placed in the task implementation queue is consumed by a worker agent to perform substantive processing of the execution event corresponding to the second type of message;
initiating execution of the plurality of instructions of the long running application;
identifying a first type of message and placing the first type of message in the application queue;
removing the first type of message from the application queue and consuming the first type of message with the orchestration agent, and then updating a transaction history with a first state of the long running application based on the consoled first type of message;
identifying a second type of message and placing the second type of message in the implementation queue; and
removing the second type of message from the implementation queue and consuming the second type of message with the worker agent, and then updating the transaction history with a second state of the long running application based on the consumed second type of message;
identifying that an execution event for at least one retrieved instruction is a new event that has taken place with respect to execution by an orchestration agent;
as a result of identifying that a new event has taken place, establishing the state of the execution for the long running application by replaying any previous state from the transaction history; and
after replaying any previous state from the transaction history, executing a next instruction of the long running application, the next instruction executing only after the previous state from the transaction history has been replayed.

12. The computer program product of claim 1, further comprising repeating the acts of claim 1 until all instructions have been executed for a particular orchestration of the long running program.

13. The computer program product of claim 12, wherein executing a next instruction of the long running application comprises making a call to a long running application activity.

14. The computer program product of claim 12, wherein identifying that a new event has taken place comprises identifying that an asynchronous event has occurred due to the completion of work resulting from an asynchronous instruction in a long running application framework.

15. The computer program product of claim 12, wherein identifying that a new event has taken place comprises identifying that a timer has fired.

16. The computer program product of claim 12, wherein identifying that a new event has taken place comprises identifying that a sub-orchestration is to be created to extend the life of the long-running application.

17. The computer program product of claim 12, wherein identifying that a new event has taken place comprises identifying that an event external to the long running application framework has occurred.

18. The computer program product of claim 12, wherein generating the history if execution events for the plurality of instructions of a long running application includes generating the history for one or more asynchronous instructions of the long running application.

19. The computer program product of claim 18, wherein identifying that an execution event for at least one retrieved instruction is a new event that has taken place results in performing the further acts of:
removing a first type of message for a previous execution event from the
application queue;
adding a second type of message for the new event in the implementation queue;
updating the transaction history to add a new state created as a result of executing the retrieved instruction for the new event; and wherein removing the first type of message for the previous execution event form application queue, adding the second type of message for the new event to the implementation queue, and updating the transaction history are performed transactionally such that all three either successfully complete and commit, or all three abort and are rolled back.

20. A processing system for executing a long running application while maintaining state of the application, comprising:
one or more processors; and
a physical computer readable storage medium comprising computer executable instructions that when executed by one or more processors cause a computer-implemented method to be performed, the computer-implemented method facilitating replay of a long running application having a plurality of instructions, by maintaining and using a history of executed events to replay program execution for rebuilding state each time a new instruction is executed, so that a developer of the long running application is able to implement control flow as regular native framework code rather than creating specific plumbing code between distributed elements, and the computer-implemented method comprising:
generating a history of execution events for a plurality of instructions of a long running application, by performing the following:
initiating an application queue and a task implementation queue, where a first type of message for an execution event placed in the application queue is consumed by an orchestration agent to direct processing of the execution event, and a second type of message for an execution event placed in the task implementation queue is consumed by a worker agent to perform substantive processing of the execution event corresponding to the second type of message:
initiating execution of the plurality of instructions of the long running application;
identifying a first type of message and placing the first type of message in the application queue;
removing the first type of message from the application queue and consuming the first type of message with the orchestration agent, and then updating a transaction history with a first state of the long running application based on the consumed first type of message;
identifying a second type of message and placing the second type of message in the implementation queue; and
removing the second type of message for the implementation queue and consuming the second type of message with the worker agent, and then updating the transaction history with a second state of the long running application based on the consumed second type of message;
identifying that an execution event for at least one retrieved instruction is a new event that has taken place with respect to execution by an orchestration agent;
as a result of identifying that a new event has taken place establishing the state of the execution for the long running application by replaying any previous state from the transaction history; and
after replaying any previous state from the transaction history, executing a next instruction of the long running application, the next instruction executing only after the previous state from the transaction history has been replayed.

* * * * *